US010999910B2

(12) United States Patent
Sengodan

(10) Patent No.: US 10,999,910 B2
(45) Date of Patent: May 4, 2021

(54) PULSE PHASE MODULATION BASED DC-DC CONVERTER WITH ADJUSTABLE CURRENT CONTROL DRIVE

(71) Applicant: Goodrich Corporation, Charlotte, NC (US)

(72) Inventor: Rajkumar Sengodan, Tamilnadu (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/925,639

(22) Filed: Jul. 10, 2020

(65) Prior Publication Data
US 2021/0014950 A1    Jan. 14, 2021

(30) Foreign Application Priority Data

Jul. 12, 2019  (IN) .............................. 201911028092

(51) Int. Cl.
H02M 3/07 (2006.01)
H05B 45/32 (2020.01)
H05B 45/44 (2020.01)
H05B 45/3725 (2020.01)
H02M 1/08 (2006.01)

(52) U.S. Cl.
CPC .......... H05B 45/3725 (2020.01); H02M 1/08 (2013.01); H02M 3/073 (2013.01); H05B 45/32 (2020.01); H05B 45/44 (2020.01)

(58) Field of Classification Search
None
See application file for complete search history.

(56) References Cited

U.S. PATENT DOCUMENTS

| | | | |
|---|---|---|---|
| 4,199,805 | A | 4/1980 | Martinelli et al. |
| 7,382,634 | B2 | 6/2008 | Buchmann |
| 10,257,625 | B2 | 4/2019 | Larsen et al. |
| 10,277,209 | B2 | 4/2019 | Hsieh et al. |
| 2007/0146051 | A1 | 6/2007 | Tsen |
| 2015/0054571 | A1 | 2/2015 | Watanabe et al. |
| 2015/0214848 | A1 | 7/2015 | Umetani |
| 2017/0054364 | A1* | 2/2017 | Ferdowsi ............... H02M 3/158 |
| 2018/0205315 | A1* | 7/2018 | Giuliano ............... H02M 3/073 |

FOREIGN PATENT DOCUMENTS

| | | |
|---|---|---|
| CN | 102420452 A | 4/2012 |
| CN | 204539097 U | 8/2015 |
| WO | 2015039077 A1 | 3/2015 |
| WO | 2015040519 A1 | 3/2015 |

OTHER PUBLICATIONS

Alzahrani et al., "A Family of Scalable Non-Isolated Interleaved DC-DC Boost Converters With Voltage Multiplier Cells", IEEE Access, vol. 7, 2019, pp. 11707-11721.
EP Search Report; dated Nov. 3, 2020; EP Application No. 20185292.8; Filed: Jul. 10, 2020; 10 pages.

* cited by examiner

Primary Examiner — Dedei K Hammond
(74) Attorney, Agent, or Firm — Cantor Colburn LLP

(57) ABSTRACT

Systems and methods for operating a light-emitting diode (LED) driver circuit are provided. Aspects include a charge pump comprising a plurality of diodes and a plurality of capacitors, a phase sequencer configured to provide a plurality of control inputs, wherein the plurality of control inputs are coupled to the charge pump, a set of light-emitting diodes (LEDs) coupled to the charge pump, and a power supply coupled to an input of the charge pump.

19 Claims, 3 Drawing Sheets

PULSE PHASE MODULATION BASED DC-DC CONVERTER WITH ADJUSTABLE CURRENT CONTROL DRIVE

CROSS-REFERENCE TO RELATED APPLICATIONS

This application claims the benefit of Indian Patent Application number 201911028092 filed Jul. 12, 2019, which is incorporated herein by reference in its entirety.

BACKGROUND

The present invention generally relates to light emitting diodes (LEDs), and more specifically, to circuit and method for a pulse phase modulation based DC-DC converter with adjustable current control drive.

LEDs can be utilized in many power sensitive applications such as, for example, displays and low power electronic devices in aircraft lighting systems, aircraft interiors, aircraft display, landing lights, strobe lights for flashing emergency needs, automobiles, and commercial uses. However, current LED driving circuits utilizing inductive boost converters suffer from power losses and the potential for electromagnetic interference. Conventional inductive boost converters can face these power losses and interference particularly in power sensitive applications for LED drives, displays, non-volatile memories and low power high-voltage electronic devices in aircraft, automobiles, and consumer electronics.

SUMMARY

Embodiments of the present invention are directed to system. A non-limiting example of the system includes a charge pump comprising a plurality of diodes and a plurality of capacitors, a phase sequencer configured to provide a plurality of control inputs, wherein the plurality of control inputs are coupled to the charge pump, a set of light-emitting diodes (LEDs) coupled to the charge pump, and a power supply coupled to an input of the charge pump.

Embodiments of the present invention are directed to a method for operating an LED circuit. A non-limiting example of the method includes providing a power supply, providing a set of LEDs, providing a charge pump comprising a plurality of diodes and a plurality of capacitors, wherein the charge pump provides a voltage to the set of LEDs, operating a phase sequencer to provide a plurality of control inputs to the charge pump, wherein the plurality of control inputs are coupled to each of the plurality of capacitors, and operating one or more disable circuits to provide one or more disable signals, wherein the one or more disable signals block one or more control inputs of the plurality of control inputs.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Turning now to an overview of technologies that are more specifically relevant to aspects of the invention, LEDs can be utilized in many power sensitive applications such as, for example, displays and low power electronic devices in aircraft lighting systems, aircraft interiors, aircraft display, landing lights, strobe lights for flashing emergency needs, automobiles, and commercial uses. However, as mentioned above, when employing inductive boost convertors in the LED driver circuits, these LED driver circuits can face power losses and interference.

The above-described aspects of the invention address the shortcomings of the prior art by providing a pulse phase modulation with adjustable current control drive to overcome the power losses that occur in convention inductive boost converters and ensure reduces electro-magnetic interference in power sensitive applications. Embodiments described further herein utilize a diode chain capacitive voltage multiplier which provides voltage output in a more efficient manner.

Figure 1:
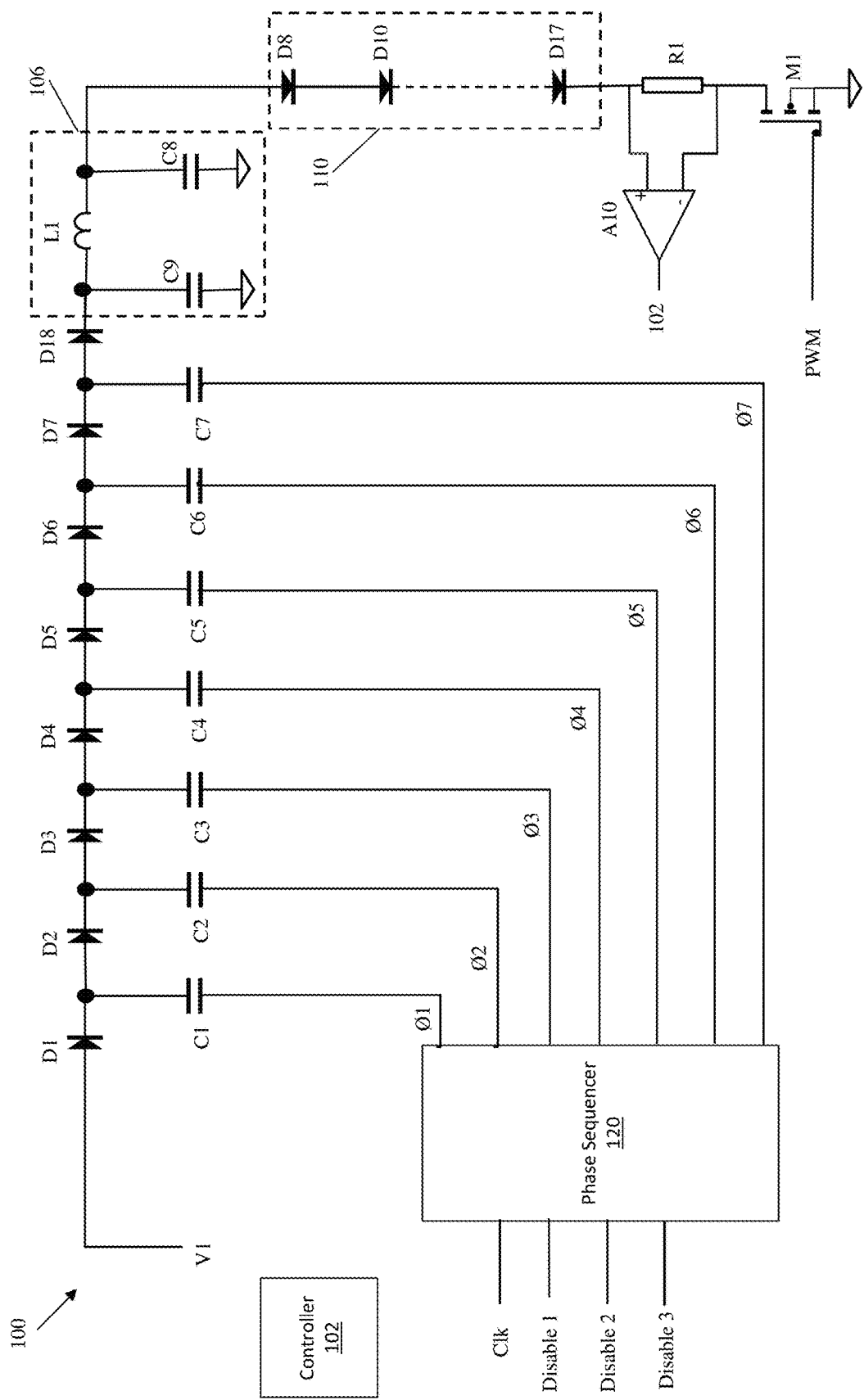
FIG. 1 depicts a block diagram of a circuit topology driving a set of light emitting diodes according to one or more embodiments.

FIG. 1 depicts a circuit topology for an LED driving circuit according to one or more embodiments. The LED driving circuit 100 includes a diode chain capacitive voltage multiplier with a phase sequenced controlled circuit 120. The LED driving circuit 100 is configured to provide high voltage and lower ripple applications with reduced electro-magnetic interference drive due to having a simple structure with fewer components. The topology and operation of the LED driving circuit 100 will be discussed in greater detail below.

Figure 2:
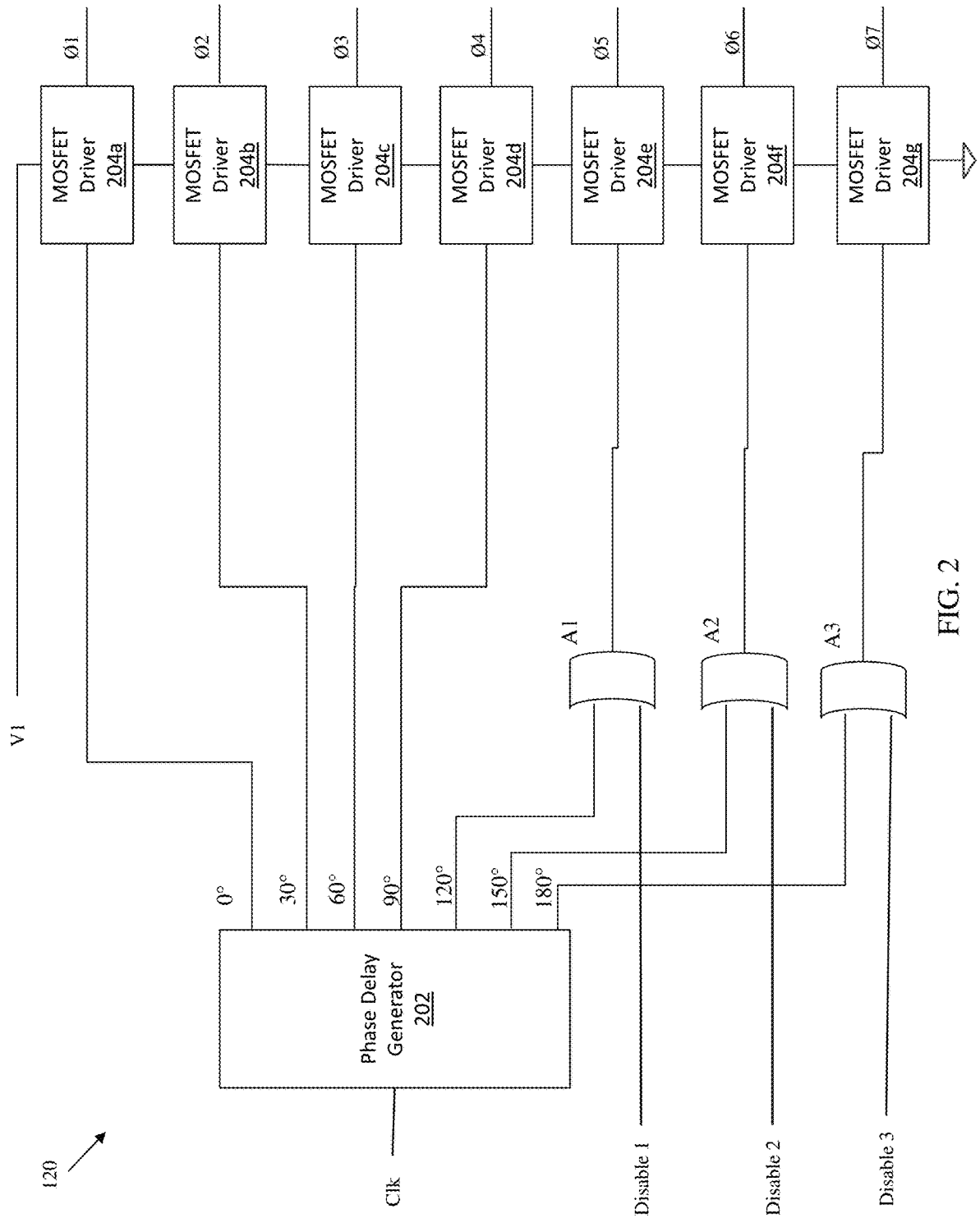
FIG. 2 depicts a block diagram of the phase sequenced controlled circuit 120 according to one or more embodiments.

FIG. 2 depicts a block diagram of the phase sequenced controlled circuit 120 according to one or more embodiments. The phase sequenced controlled circuit 120 (sometimes referred to herein as "phase sequencer block") includes a pulse generator (Clk) and a constant voltage source V1. The pulse generator (Clk) and constant voltage source V1 are utilized to operate capacitor switches. The phase sequencer block 120 includes the Clk pulse, constant direct current voltage V1, n-sequenced phase delay generator with multiple output and half bridge MOSFET based capacitor drivers (204a-204g). The half bridge MOSFET drivers (204a-204g) can be configured with n-channel and p-channel MOSFETs or both of n-channel MOSFETs. The illustrated example shows a seven capacitor stage circuit which can be increased or decreased depending on the load requirements. In the illustrated example, the $t_{on}$ pulse period is dived with respect to the number of capacitor stages (e.g., 7) required for the phase sequencer.

In one or more embodiments, the half bridge MOSFET drivers (204a-204g) output (Ø1-Ø7) are coupled to capacitors (C1-C7 from FIG. 1). The half bridge MOSFET drivers (204a-204g) includes a delay module that is implemented between the corresponding NMOS and PMOS gate connection in-order to create a dead time period to avoid shorting of the DC supply to ground during switching transition periods. The phase delay for each capacitor (C1-C7 from FIG. 1) is equal to the Clock ($t_{on}$) divided by the number of capacitors which is measured in seconds. The phase sequencer block 120 also includes three OR gates A1, A2, A3. The OR gates A1, A2, A3 receive input from the phase delay generator 202 and an external DISABLE signal. This feature will disengage the particular capacitor stage from voltage multiplier action which reduces output voltage and in turn will reduce output current in the LED string (110 from FIG. 1). This disable feature can be implemented to as many capacitor stages and is not limited to three as shown in the illustrated example.

In one or more embodiments, the phase delay generator 202 can be implemented using a microcontroller or constructed utilizing logic gates to deliver a waveforms with a spacing angle of 30 degrees (i.e., delay between V(Ø1) and V(Ø2)). The spacing angle is selected based on the voltage need and takes into consideration the charging and discharging time with respect to the load current.

Referring back to FIG. 1, the constant voltage source V1 will provide the forward bias for the diode chain to be in conducting state and these diodes (D1-D7) are connected to one end of capacitors (C1-C7). V1 charges the capacitors (C1-C7) at each switching cycle. The Clock (Clk) is provided to the phase sequencer 120 for generating multiple phase delay signals. These signals are fed to the corresponding gates of the half bridge MOSFETs (204a-204g from FIG. 2) and this mechanism acts as a push-pull configuration capacitor to act as a charge pump for an individual stage. A series resistor can be added at the output of V1 to limit the capacitor charging current. (not shown). In one or more embodiments, the voltage across R1 can be sensed by a difference amplifier A10 and fed back to the controller 102 to do an automatic phase sequence control based on current through the LED string 110. The LED current is limited by R1 and controlled by varying the duty cycle of phase sequence in a closed loop configuration according to one or more embodiments.

In one or more embodiments, the operating cycle of the charge pump is described below. At an initial state, C1 will be charged from V1 with respect to 0V through diode D1. During Ø1, C1 will shift its voltage level from V1 to Vc1=V1+V(Ø1) potential and in turn will charge C2 through diode D2. During Ø2, C2 will shift its voltage level from Vc1 to Vc2=Vc1+V(Ø2) and charges C3 through diode D3. During Ø3, C3 will shift its voltage level from Vc2 to Vc3=Vc2+V(Ø3) and charge C4 through diode D4. During Ø4, C4 will shift its voltage level from Vc3 to Vc4=Vc3+V(Ø4) and charge C5 through diode D5. During Ø5, C5 will shift its voltage level from Vc4 to Vc5=Vc4+V(Ø5) and charge C6 through diode D6. During Ø6, C6 will shift its voltage level from Vc5 to Vc6=Vc5+V(Ø6) and charge C7 through diode D7. And during Ø7, C7 will shift its voltage level from Vc6 to Vc7=Vc6+V(Ø7) and charge C9 and C8 through diode D18. In the subsequent cycle, C9 will output the voltage to the diode string 110. The output voltage after the LC filter 106 is equal to Vc8−Vdiode drop in series (D1, D2, . . . , D7, D18). The LED string 106 included diodes D8-D17 that are connected in series with a series current limiting resistor R1 and a pulse width modulation (PWM) control NMOS switch M1. The current limiting resistor R1 will drop any excess voltage and contribute current setting for the LED string 110. The DISABLE1, DISABLE2, and DISABLE3 signal contributes to reduce LED current in order to change LED color temperature. DISABLE 3 signal will disengage C7 from the charge pump configuration to reduce current flow in the LED string 110. DISABLE 2 signal disengages C6 from the charge pump configuration which in turn also reduces current flow in the LED string 110. Finally, DISABLE 1 signal will disengage C5 from the charge pump thus reducing the current flow in the LED string 110. In one or more embodiments, the DISABLE1, DISABLE2, DISABLE3 signals and the PWM signal can be controlled by the controller 102.

In one or more embodiments, the controller 102 or any of the hardware referenced in the circuit 100 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

In one or more embodiments, the LC filter 106 can be an LC pi-filter. The LC filter 106 at the output of the charge pump is utilized to reduce voltage and current ripple content for the power LED drive. This allows for providing almost constant voltage for LED drive to reduce LED flickering and increase reliability of LED failures. The cutoff frequency (Fc) can be calculated as Fc=1/(2π*√(L*C)) Hz.

Figure 3:
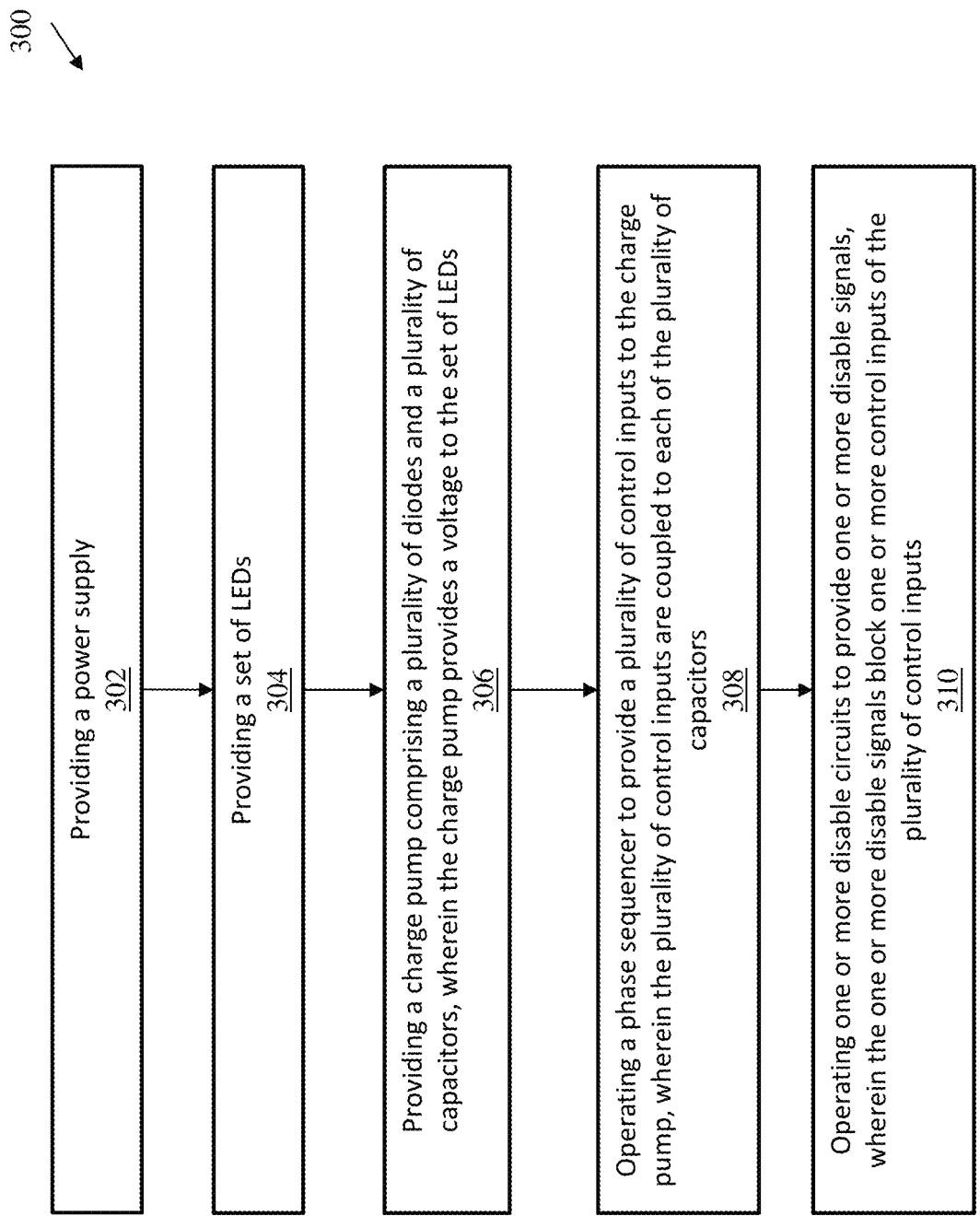
FIG. 3 depicts a flow diagram of a method for operating an LED driver circuit according to one or more embodiments.

FIG. 3 depicts a flow diagram of a method for operating an LED driver circuit according to one or more embodiments. The method 300 includes providing a power supply, as shown in block 302. The power supply can be a direct current (DC) power supply configured to provide forward bias to at least the first diode in the charge pump. At block 304, the method 300 includes providing a set of LEDs. And at block 306, the method 300 includes providing a charge pump comprising a plurality of diodes and a plurality of capacitors, wherein the charge pump provides a voltage to the set of LEDs. The method 300, at block 308, includes operating a phase sequencer to provide a plurality of control inputs to the charge pump, wherein the plurality of control inputs are coupled to each of the plurality of capacitors. The control inputs are waveforms that are out of phase with each other and are coupled to the capacitors to provide additional voltage to drive the following diodes in the charge pump. The waveforms are out of phase by Ton divided by (n−1) capacitors in the charge pump where n is the number of capacitors in the charge pump circuit. So for a charge pump with seven stages (e.g., seven capacitors), the out of phase angle is 30 degrees considering 50% duty cycle and includes a reference signal (Ø1) with phase angle '0' degrees. That is to say, the seven capacitor charge pump has the following phase angles: 0 degrees, 30 degrees, 60 degrees, 90 degrees, 120 degrees, 150 degrees, and 180 degrees. At block 310, the method 300 also includes operating one or more disable circuits to provide one or more disable signals, wherein the one or more disable signals block one or more control inputs of the plurality of control inputs.

Additional processes may also be included. It should be understood that the processes depicted in FIG. 3 represent illustrations, and that other processes may be added or existing processes may be removed, modified, or rearranged without departing from the scope and spirit of the present disclosure.

Various embodiments are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a charge pump comprising a plurality of diodes and a plurality of capacitors;
   a phase sequencer configured to provide a plurality of control inputs, wherein the plurality of control inputs are coupled to the charge pump;
   a set of light-emitting diodes (LEDs) coupled to the charge pump;
   a power supply coupled to an input of the charge pump; and
   a controller configured to operate one or more disable signals, wherein the one or more disable signals block one or more control inputs of the plurality of control inputs from the phase sequencer.

2. The system of claim 1 further comprising:
   an electronic filter comprising an input and an output, wherein the input of the electronic filter is coupled to an output of the charge pump, and wherein the output of the electronic filter is coupled to an input of the set of LEDs.

3. The system of claim 2, wherein the electronic filter comprises an LC pi-filter.

4. The system of claim 1, wherein the plurality of control inputs provide a plurality of waveforms comprising a first waveform and a second waveform; and
   wherein the first waveform is out of phase of the second waveform by a spacing angle.

5. The system of claim 4, wherein the spacing angle comprises one hundred and eighty degrees divided by a number of the plurality of capacitors.

6. The system of claim 1, wherein the phase sequencer comprises:
   a plurality of capacitor drivers configured to provide the plurality of control inputs;
   a controller configured to provide a plurality of waveforms that are out of phase with each other by a spacing angle.

7. The system of claim 6, wherein the plurality of capacitor drivers comprise half bridge metal-oxide semiconductor field effect transistor (MOSFET) capacitor drivers.

8. The system of claim 6, wherein the plurality of capacitor drivers comprise a N-type MOSFET and a P-type MOSFET.

9. The system of claim 6, wherein the plurality of capacitor drivers comprise two N-type MOSFETs.

10. The system of claim 1, wherein the power supply comprises a direct current (DC) power supply.

11. A method for operating a light emitting diode (LED) driver circuit, the method comprising:
providing a power supply;
providing a set of LEDs;
providing a charge pump comprising a plurality of diodes and a plurality of capacitors, wherein the charge pump provides a voltage to the set of LEDs;
operating a phase sequencer to provide a plurality of control inputs to the charge pump, wherein the plurality of control inputs are coupled to each of the plurality of capacitors; and
operating one or more disable circuits to provide one or more disable signals, wherein the one or more disable signals block one or more control inputs of the plurality of control inputs.

12. The method of claim 11 further comprising:
providing an electronic filter comprising an input and an output, wherein the input of the electronic filter is coupled to an output of the charge pump, and wherein the output of the electronic filter is coupled to an input of the set of LEDs.

13. The method of claim 12, wherein the electronic filter comprises an LC pi-filter.

14. The method of claim 11, wherein the plurality of control inputs provide a plurality of waveforms comprising a first waveform and a second waveform; and
wherein the first waveform is out of phase of the second waveform by a spacing angle.

15. The method of claim 14, wherein the spacing angle comprises one hundred and eighty degrees divided by a number of the plurality of capacitors.

16. The method of claim 11, wherein the phase sequencer comprises:
a plurality of capacitor drivers configured to provide the plurality of control inputs;
a controller configured to provide a plurality of waveforms that are out of phase with each other by a spacing angle.

17. The method of claim 16, wherein the plurality of capacitor drivers comprise half bridge metal-oxide semiconductor field effect transistor (MOSFET) capacitor drivers.

18. The method of claim 16, wherein the plurality of capacitor drivers comprise a N-type MOSFET and a P-type MOSFET.

19. The method of claim 16, wherein the plurality of capacitor drivers comprise two N-type MOSFETs.

* * * * *